(12) United States Patent
Khripin

(10) Patent No.: US 12,270,686 B2
(45) Date of Patent: *Apr. 8, 2025

(54) MAGNETIC ENCODER CALIBRATION

(71) Applicant: Boston Dynamics, Inc., Waltham, MA (US)

(72) Inventor: Alex Khripin, Waltham, MA (US)

(73) Assignee: Boston Dynamics, Inc., Waltham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/469,994

(22) Filed: Sep. 19, 2023

(65) Prior Publication Data

US 2024/0003721 A1 Jan. 4, 2024

Related U.S. Application Data

(60) Continuation of application No. 17/661,989, filed on May 4, 2022, now Pat. No. 11,796,357, which is a division of application No. 16/518,191, filed on Jul. 22, 2019, now Pat. No. 11,353,345.

(51) Int. Cl.
| | |
|---|---|
| *G01D 18/00* | (2006.01) |
| *B25J 9/16* | (2006.01) |
| *G01D 5/244* | (2006.01) |
| *G01D 5/347* | (2006.01) |

(52) U.S. Cl.
CPC .......... *G01D 18/001* (2021.05); *B25J 9/1692* (2013.01); *G01D 5/2448* (2013.01); *G01D 5/347* (2013.01)

(58) Field of Classification Search
CPC ..... G01D 18/001; G01D 5/2448; G01D 5/347

USPC .......................................................... 702/94
See application file for complete search history.

(56) References Cited

U.S. PATENT DOCUMENTS

| | | | |
|---|---|---|---|
| 5,930,905 | A | 8/1999 | Zabler et al. |
| 9,291,602 | B1 | 3/2016 | Prachar |
| 9,372,100 | B2 | 6/2016 | Cho et al. |
| 9,645,565 | B2 | 5/2017 | Nilsson |
| 9,948,155 | B2 | 4/2018 | Moura et al. |
| 10,514,255 | B2 * | 12/2019 | Horiguchi ................ G01D 5/36 |

(Continued)

FOREIGN PATENT DOCUMENTS

| | | |
|---|---|---|
| CN | 101038172 A | 9/2007 |
| CN | 101709971 A | 5/2010 |

(Continued)

OTHER PUBLICATIONS

Japanese Office Action dated Dec. 8, 2023 in Application No. 2021-576732.

(Continued)

*Primary Examiner* — Aditya S Bhat
(74) *Attorney, Agent, or Firm* — Knobbe, Martens, Olson & Bear, LLP

(57) ABSTRACT

A method for calibrating a position measurement system includes receiving measurement data from the position measurement system and determining that the measurement data includes periodic distortion data. The position measurement system includes a nonius track and a master track. The method also includes modifying the measurement data by decomposing the periodic distortion data into periodic components and removing the periodic components from the measurement data.

17 Claims, 12 Drawing Sheets

(56) References Cited

U.S. PATENT DOCUMENTS

| | | | |
|---|---|---|---|
| 11,353,345 B2 | 6/2022 | Khripin | |
| 11,796,357 B2 | 10/2023 | Khripin | |
| 2004/0004471 A1 | 1/2004 | Haas et al. | |
| 2005/0209536 A1 | 9/2005 | Dariush | |
| 2010/0303460 A1 | 12/2010 | Hunter | |
| 2014/0028478 A1* | 1/2014 | Mizoguchi | G01D 5/244 341/11 |
| 2014/0244196 A1 | 8/2014 | Uchida et al. | |
| 2015/0120049 A1 | 4/2015 | Motoyoshi | |
| 2015/0130931 A1 | 5/2015 | Shigeta | |
| 2015/0145595 A1 | 5/2015 | Bushmaker | |
| 2016/0164382 A1 | 6/2016 | Moura et al. | |
| 2018/0094924 A1 | 4/2018 | Horiguchi | |
| 2020/0003585 A1 | 1/2020 | Narita | |
| 2022/0260398 A1 | 8/2022 | Khripin | |

FOREIGN PATENT DOCUMENTS

| | | |
|---|---|---|
| CN | 103322904 A | 9/2013 |
| CN | 107727364 A | 2/2018 |
| CN | 109725332 A | 5/2019 |
| DE | 10041096 | 3/2002 |
| DE | 10218332 | 10/2003 |
| EP | 3301401 | 4/2018 |
| JP | H02207496 | 8/1990 |
| JP | 2001033277 | 2/2001 |
| JP | 2006150556 | 6/2006 |
| JP | 2008145299 A | 6/2008 |
| JP | 2008526457 | 7/2008 |
| JP | 2012192498 | 10/2012 |
| JP | 2014134480 | 7/2014 |
| JP | 2014157069 | 8/2014 |
| JP | 2015085421 | 5/2015 |
| JP | 2015121405 | 7/2015 |
| JP | 2015206614 | 11/2015 |
| JP | 2016197015 | 11/2016 |
| NO | 994073 | 8/1999 |
| WO | WO 2006/043403 | 5/2008 |
| WO | WO 2013/158148 A1 | 10/2013 |
| WO | WO 2015/191230 A1 | 12/2015 |
| WO | WO 2018/190019 | 10/2018 |
| WO | WO 2021/015954 | 1/2021 |

OTHER PUBLICATIONS

Chinese Office Action dated Jun. 19, 2024 in Application No. 202080052341.7; 41 pages.

Japanese Office Action dated Feb. 2, 2023 in Application No. 2021-576732.

Japanese Office Action dated Jun. 27, 2023 in Application No. 2021-576732.

International Search Report and Written Opinion dated Oct. 12, 2020 for Application No. PCT/US2020/041304 (13 pgs).

Chinese Office Action dated Nov. 21, 2024, in Application No. 202080052341.7; (34 pages).

EPO Notice of Opposition against EP 4004494 B1 filed Aug. 8, 2024 (31 pages).

Japanese Office Action dated Dec. 8, 2023, in Application No. 2021-576732 (11 pages).

\* cited by examiner

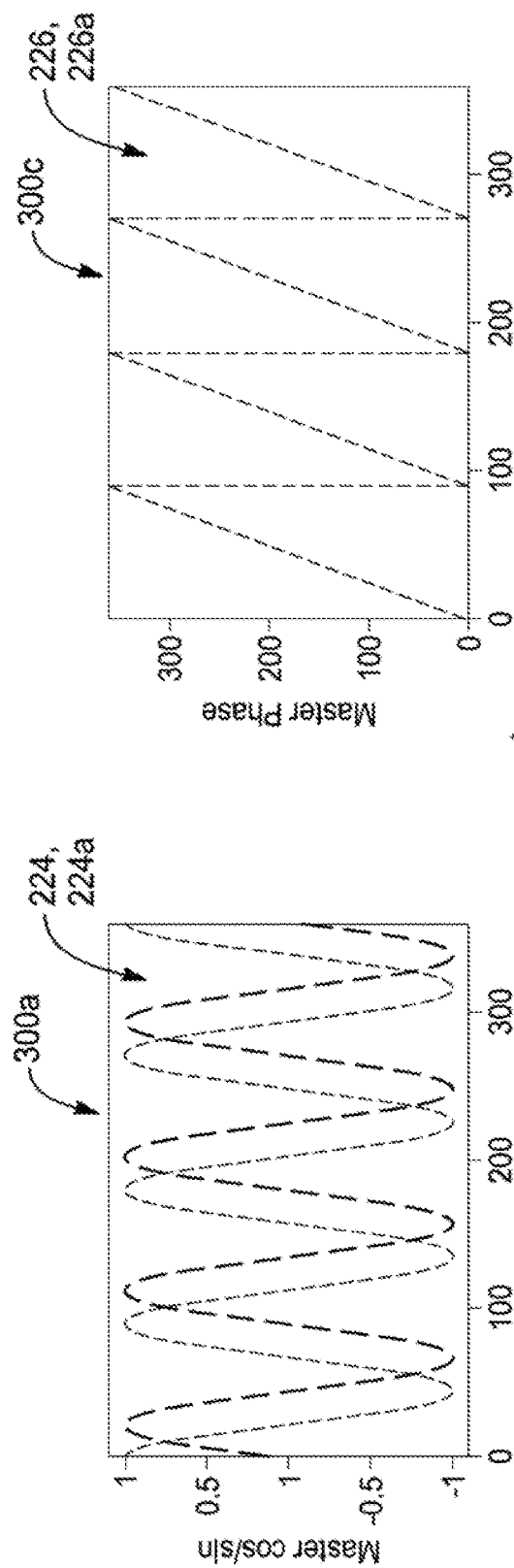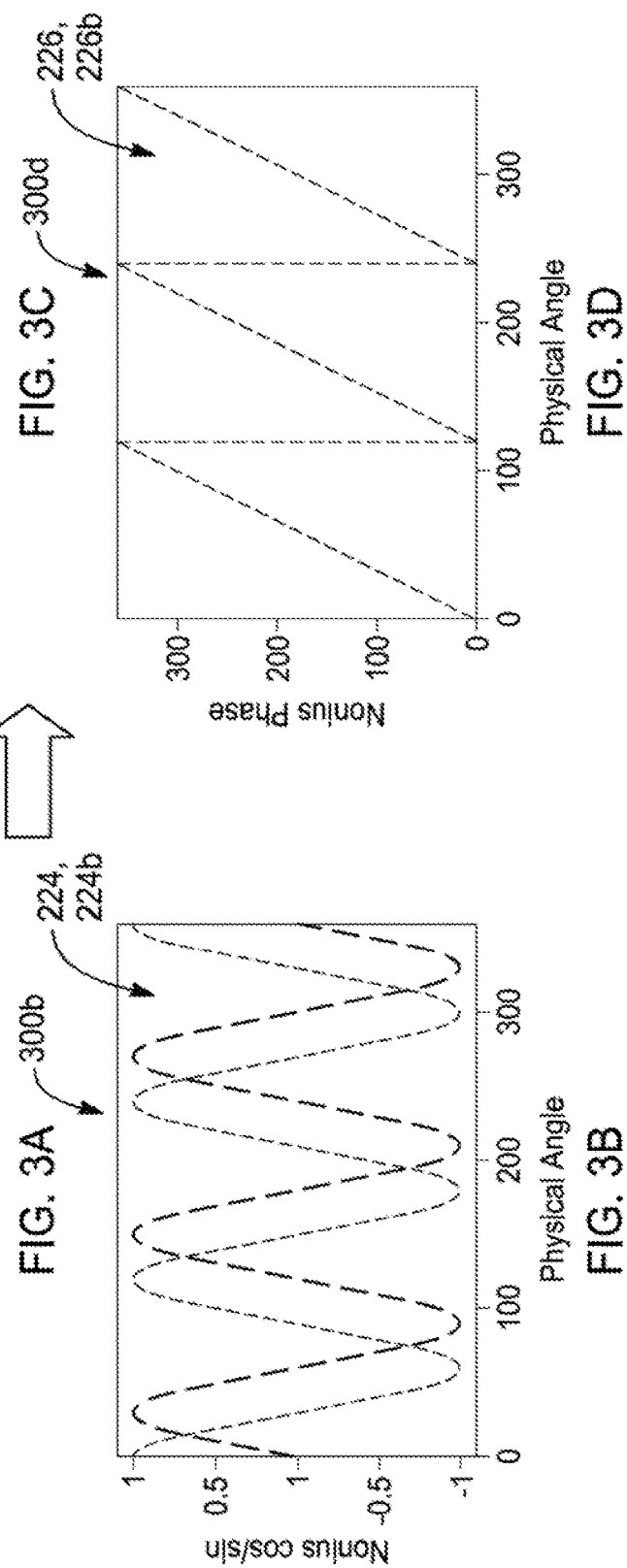
FIG. 3A  FIG. 3B  FIG. 3C  FIG. 3D

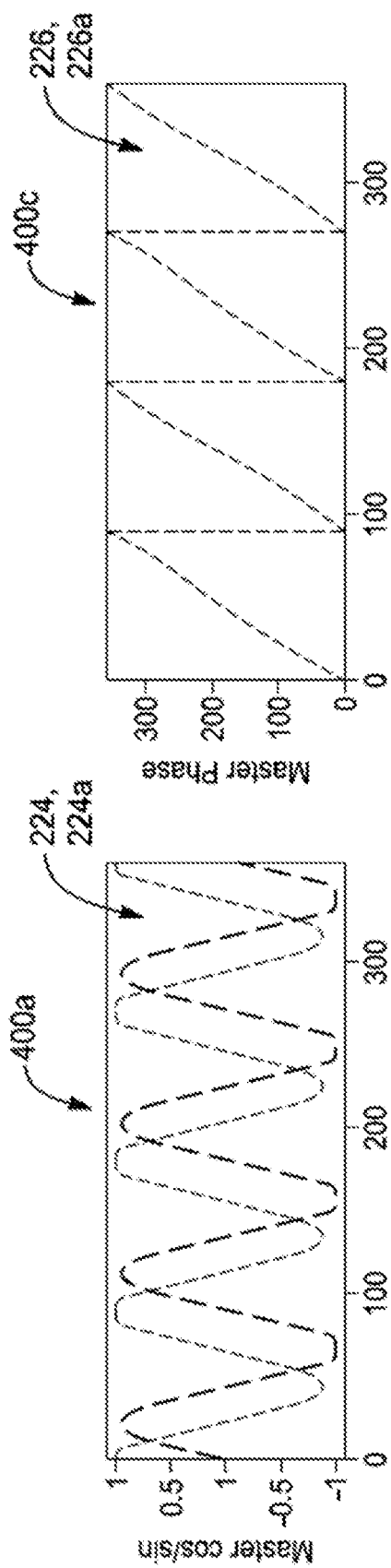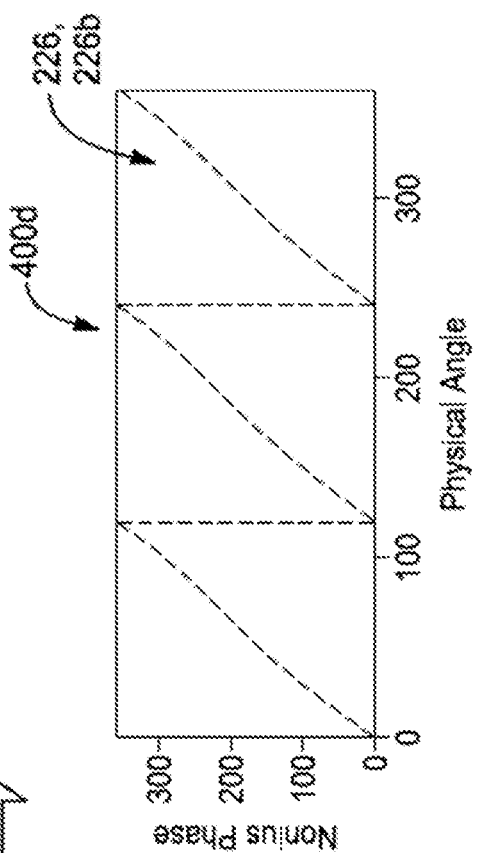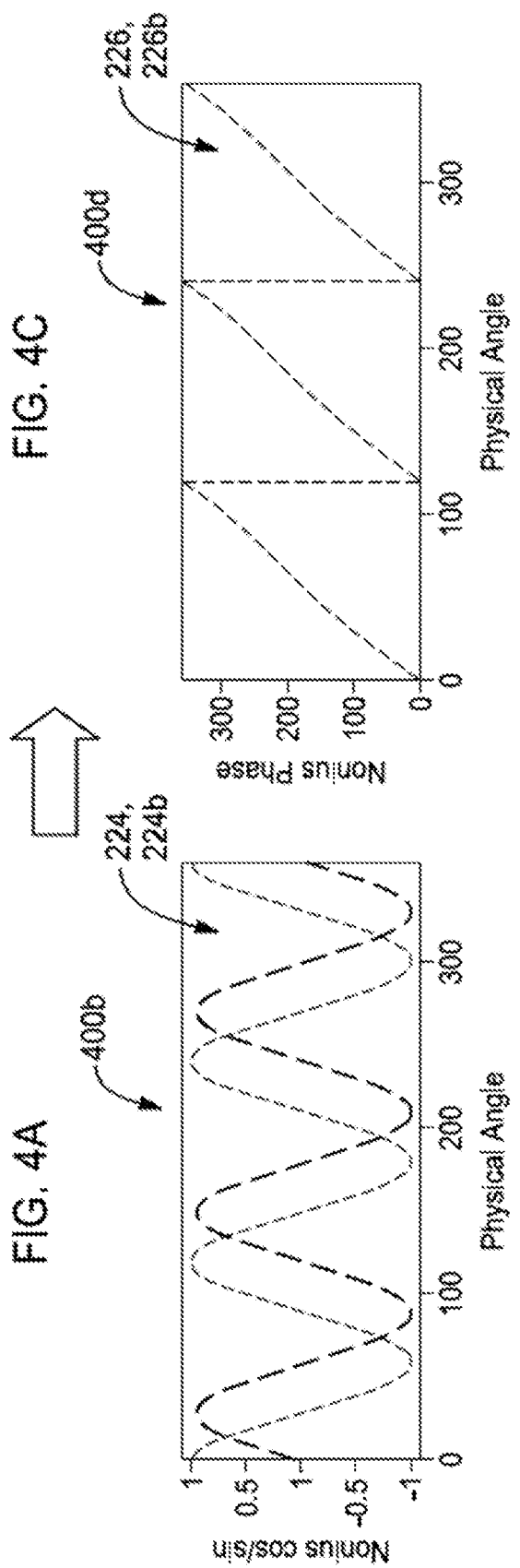

MAGNETIC ENCODER CALIBRATION

CROSS REFERENCE TO RELATED APPLICATIONS

This application is a continuation of U.S. patent application Ser. No. 17/661,989, filed on May 4, 2022, which is a divisional of U.S. patent application Ser. No. 16/518,191, filed on Jul. 22, 2019. The disclosures of these prior applications are considered part of the disclosure of this application and are hereby incorporated by reference in their entirety.

TECHNICAL FIELD

This disclosure relates to magnetic encoder calibration.

BACKGROUND

Robots currently perform tasks in various working environments, such as factories, storage facilities, office buildings, and hospitals. Robot control systems rely upon measurement data collected from a variety of sensors to determine a current state of the robot, and to control future states of the robot. To accurately monitor and control the state of the robot, the sensors must be calibrated for implementation in the robot. Accordingly, sensor calibration must account for deviations introduced by the robotic system, such as mounting geometries and mechanical variations within the components of the robot.

SUMMARY

One aspect of the disclosure provides a method for calibrating a sensor. The method includes, receiving, at data processing hardware, measurement data from a position measurement system, the position measurement system including a nonius track and a master track. The method also includes determining, by the data processing hardware, that the measurement data includes periodic distortion data. Additionally, the method includes modifying, by the data processing hardware, the measurement data by decomposing the periodic distortion data into periodic components, and removing the periodic components from the measurement data.

Implementations of the disclosure may include one or more of the following optional features. In some implementations, determining that the measurement data includes periodic distortion data includes filtering out low-frequency content of the measurement data to isolate high-frequency content of the measurement data, the high-frequency content of the measurement data including the periodic distortion data. Additionally or alternatively, the measurement data corresponds to velocity measurement data as a function of time.

In some examples, the method includes, after modifying the measurement data, generating, by the data processing hardware, a calibration profile corresponding to the modified measurement data, calibrating, by the data processing hardware, the position measurement system using the calibration profile. Additionally or alternatively, the periodic distortion data corresponds to at least one of a gain error, sensor saturation, or a physical variation in magnetic pole spacing at the position measurement system. In some implementations, the measurement data includes first measurement data for the master track and second measurement data for the nonius track. Here, the periodic distortion data is present in each of the first measurement data and the second measurement data. In some implementations, the position measurement system is coupled to a joint of a robot.

In some examples, receiving measurement data from the position measurement system includes executing a calibration mode for calibrating the position measurement system coupled to the robot, where the calibration mode is configured to actuate a limb of the robot through a range of motion about the joint. Here, receiving the measurement data may also include receiving the measurement data from the position measurement system, where the measurement data is associated with the actuation of the limb of the robot.

Another aspect of the disclosure provides system having data processing hardware and memory hardware in communication with the data processing hardware, the memory hardware storing instructions that when executed on the data processing hardware cause the data processing hardware to perform operations. The operations performed by the data processing hardware include receiving measurement data from a position measurement system, where the position measurement system includes a nonius track and a master tracks. The operations also include determining that the measurement data includes periodic distortion data, and modifying the measurement data by decomposing the periodic distortion data into periodic components and removing the periodic components from the measurement data.

This aspect may include one or more of the following optional features. In some implementations, determining that the measurement data includes periodic distortion data includes filtering out low-frequency content of the measurement data to isolate high-frequency content of the measurement data, where the high-frequency content of the measurement data includes the periodic distortion data. Additionally or alternatively, the measurement data may correspond to velocity measurement data as a function of time.

In some examples, the operations further include, after modifying the measurement data, generating a calibration profile corresponding to the modified measurement data calibrating the position measurement system using the calibration profile. Optionally, the periodic distortion data corresponds to at least one of a gain error, sensor saturation, or a physical variation in magnetic pole spacing at the position measurement system. In some examples, the measurement data includes first measurement data for the master track and second measurement data for the nonius track, and the periodic distortion data is present in each of the first measurement data and the second measurement data.

In some implementations, the position measurement system is coupled to a joint of a robot. Here, receiving measurement data from the position measurement system includes executing a calibration mode for calibrating the position measurement system coupled to the robot, where the calibration mode is configured to actuate a limb of the robot through a range of motion about the joint. The measurement data is associated with the actuation of the limb of the robot.

Another aspect of the disclosure provides a method for calibrating a sensor. The method includes receiving, at data processing hardware, position measurement data associated with an off-axis position measurement system. The method also includes determining, by the data processing hardware, that the position measurement data includes periodic distortion data. The method further includes decomposing, by the data processing hardware, the periodic distortion data into periodic components. The method also includes generating, by the data processing hardware, a calibration profile based on removing the periodic components of the periodic distortion data from the position measurement data. The method further includes calibrating, by the data processing hardware, the off-axis position measurement system using the calibration profile.

This aspect may include one or more of the following optional features. In some implementations, determining that the position measurement data includes periodic distortion data includes filtering out low-frequency content of the position measurement data to isolate high-frequency content of the position measurement data, where the high-frequency content of the position measurement data has the periodic distortion data. Additionally or alternatively, decomposing the periodic distortion data into periodic components includes mapping the periodic distortion data using derivatives of harmonics of the position measurement data.

In some examples, the off-axis position measurement system is coupled to a joint of a robot. In some examples, receiving the position measurement data includes executing a calibration mode for the off-axis position measurement system, where the calibration mode is configured to actuate a limb of the robot through a range of motion about the joint. Here, the method includes receiving the position measurement data from the off-axis position measurement system, where the position measurement data is associated with the actuation of the limb of the robot.

Another aspect of the disclosure provides a system having data processing hardware and memory hardware in communication with the data processing hardware, the memory hardware storing instructions that when executed on the data processing hardware cause the data processing hardware to perform operations. The operations include receiving position measurement data associated with an off-axis position measurement system, and determining that the position measurement data includes periodic distortion data. The operations also include decomposing the periodic distortion data into periodic components, generating a calibration profile based on removing the periodic components of the periodic distortion data from the position measurement data, and calibrating the off-axis position measurement system using the calibration profile.

This aspect may include one or more of the following optional features. In some examples, determining that the measurement data includes periodic distortion data includes filtering out low-frequency content of the position measurement data to isolate high-frequency content of the position measurement data, where the high-frequency content of the position measurement data includes the periodic distortion data. In some implementations, decomposing the periodic distortion data into periodic components includes mapping the periodic distortion data using derivatives of harmonics of the position measurement data.

In some implementations, the position measurement system is coupled to a joint of a robot. Here, receiving measurement data from the position measurement system includes executing a calibration mode for calibrating the position measurement system coupled to the robot, where the calibration mode is configured to actuate a limb of the robot through a range of motion about the joint. The measurement data is associated with the actuation of the limb of the robot.

The details of one or more implementations of the disclosure are set forth in the accompanying drawings and the description below. Other aspects, features, and advantages will be apparent from the description and drawings, and from the claims.

DESCRIPTION OF DRAWINGS

FIGS. 3A and 3B show plots depicting position measurement data associated with a master track (FIG. 3A) and a nonius track (FIG. 3B) of a rotative position measurement system.

FIGS. 3C and 3D show plots depicting master phase data (FIG. 3C) and nonius phase data (FIG. 3D) for master and nonius tracks of a rotative position measurement system.

FIGS. 4A and 4B show plots depicting position measurement data associated with a master track (FIG. 4A) and a nonius track (FIG. 4B) of a rotative position measurement system with periodic distortion.

FIGS. 4C and 4D show plots depicting master phase data (FIG. 4C) and nonius phase data (FIG. 4D) for master and nonius tracks of a rotative position measurement system with periodic distortion.

Like reference symbols in the various drawings indicate like elements.

DETAILED DESCRIPTION

Figure 1:
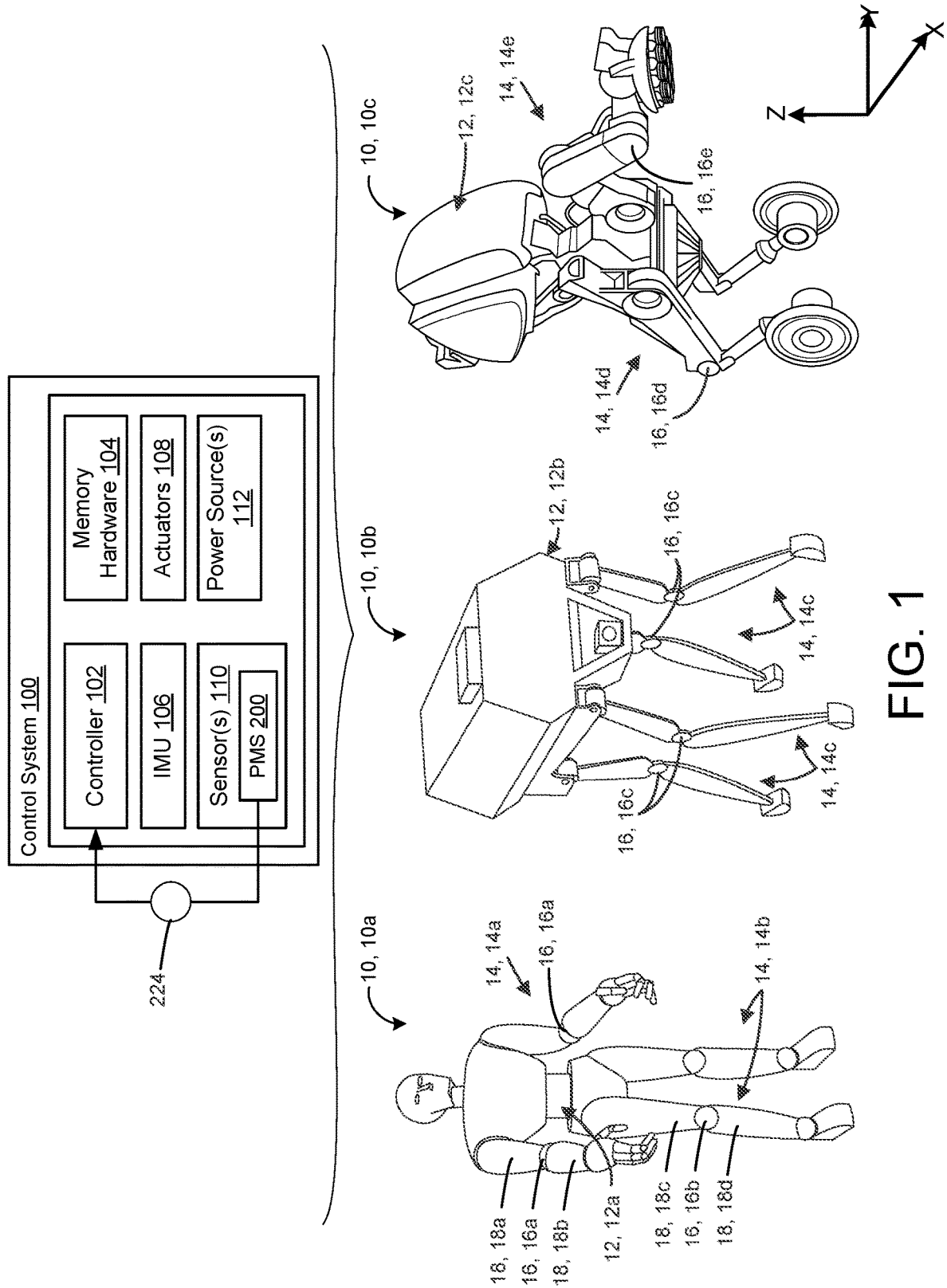
FIG. 1 is a schematic view of an example of a robotic system.

Off-axis position measurement systems are used in a variety of applications for providing position-dependent measurement data to a system controller, thereby allowing the controller to monitor and control operational parameters (e.g., absolute position, velocity) of the application. However, manufacturers of position measurement systems often provide calibration procedures that require the position measurement system to be calibrated prior to implementation into the respective application. Thus, the calibration procedure provided by the manufacturer may fail to account for distortions and errors that are caused by installation of the position measurement system into the application. In a particular example, a position measurement system may experience increased distortion based on mounting geometries within a joint of a robot. Accordingly, the position measurement system must be calibrated after installation within the robot, where the calibration procedure proposed by the position measurement system manufacturer is no longer practical.

Implementations herein are directed towards facilitating the calibration of an off-axis position measurement system installed within a joint or appendage of a robot. Here, the position measurement system is placed in a calibration mode and the joint or appendage of the robot is cycled through a range of motion. Raw position measurement data collected by the position measurement system is transmitted to a calibration system, either as raw position measurement data or as velocity measurement data. The calibration system then isolates distortion within the measurement data by filtering low-frequency measurement data associated with actual motion of the robot, thereby leaving only high-frequency measurement data associated with a periodic distortion. The high-frequency measurement data, or distortion data, is then decomposed into periodic components corresponding to derivatives of harmonics of the measurement data. The periodic components are then removed from the measurement data to provide modified measurement data including only the low-frequency measurement data associated with the actual motion of the robot. Thus, the implementations provided herein facilitate calibration of an off-axis position measurement system incorporated within a robotic system.

Referring to FIG. 1A, various examples of a robot 10, 10a-10c are shown. Examples of the robot 10 include, but are not limited to, a bipedal humanoid robot 10a, a quadrupedal robot 10b, and a wheeled robot 10c. The robot 10 includes a body 12 and a plurality of appendages 14, 14a-14e in communication with a control system 100. The body 12 of the robot 10 connects to the appendages 14 and may house various components of the robot 10, such as components of the control system 100.

The appendages 14 may include legs 14b-14d that enable the robot 10 to move relative to its environment. The legs 14b-14d are configured to operate with multiple degrees of freedom to enable different techniques of travel. Additionally or alternatively, the appendages 14 of the robot 10a, 10c may also include arms 14a, 14e to facilitate object manipulation, load carrying, and/or balancing for the robot 10. Each appendage may include attachments, such as a hand, foot, or rotary member (e.g., wheel or track).

Each of the appendages 14 may include one or more joints 16 configured to allow the appendage 14, or a portion of the appendage 14, to move relative to the body 12 of the robot 10. For example, each appendage 14 may include one or more members 18, 18a-18h connected by the joints 16, 16a-16e and configured to operate with various degrees of freedom with respect to one another. In the example shown, each of the joints 16 corresponds to a rotary or pivot joint that permits relative rotational motion between two of the members 18. However, in other examples, the robot 10 may include linear joints configured to permit relative translational motion (e.g., extension or retraction) of two or more of the members 18. A position of each of the joints 16 is measured and controlled by the control system 100.

With continued reference to FIG. 1, an example configuration of the control system 100 is configured to monitor and control operation of the robot 10. In some implementations, the robot 10 is configured to operate autonomously and/or semi-autonomously. However, a user may also operate the robot 10 by providing commands/directions to the robot 10.

In the example shown, the control system 100 includes a controller 102 (e.g., data processing hardware), memory hardware 104, an inertial measurement unit (IMU) 106, actuators 108, one or more sensors 110, and one or more power sources 112. The control system 100 is not limited to the components shown, and may include additional or less components without departing from the scope of the present disclosure. The components may communicate via wireless or wired connections and may be distributed across multiple locations of the robot 10. In some configurations, the control system 100 interfaces with a remote computing device and/or a user. For instance, the control system 100 may include various components for communicating with the robot 10, such as a joystick, buttons, wired communication ports, and/or wireless communication ports for receiving inputs from the remote computing device and/or user, and providing feedback to the remote computing device and/or user.

The controller 102 corresponds to data processing hardware that may include one or more general purpose processors, digital signal processors, and/or application specific integrated circuits (ASICs). In some implementations, the controller 102 is a purpose-built embedded device configured to perform specific operations with one or more subsystems of the robot 10. The memory hardware 104 is in communication with the controller 102 and may include one or more non-transitory computer-readable storage media such as volatile and/or non-volatile storage components. For instance, the memory hardware 104 may be associated with one or more physical devices in communication with one another and may include optical, magnetic, organic, or other types of memory or storage. The memory hardware 104 is configured to, inter alia, store instructions (e.g., computer-readable program instructions), that when executed by the controller 102, cause the controller 102 to perform numerous operations, such as, without limitation, altering a pose of the robot 10 for maintaining balance, maneuvering the robot 10 across the ground surface, transporting objects, and/or executing a sit-to-stand routine.

The controller 102 may directly or indirectly interact with the inertial measurement unit 106, the actuators 108, the sensor(s) 110, and the power source(s) 112 for monitoring and controlling operation of the robot 10. The controller 102 is configured to process data relating to the inertial measurement unit 106, the actuators 108, and the sensor(s) 110 for operating the robot 10. The controller 102 receives measurements from the inertial measurement unit 106 and the one or more sensors 110 disposed on the robot 10, and instructs actuation of at least one of the actuators 108 to change a position of the robot.

The inertial measurement unit 106 is configured to measure an inertial measurement indicative of a movement of the robot 10 that results in a change to the pose of the robot 10. The inertial measurement measured by the inertial measurement unit 106 may indicate a translation or shift of the center of mass of the robot 10. The translation or shift of the center of mass may occur along one or more of the fore-aft axis (x-axis), the lateral axis (y-axis), or the vertical axis (z-axis). For instance, the inertial measurement unit 106 may detect and measure an acceleration, a tilt, a roll, a pitch, a rotation, or yaw of the robot 10, as the inertial measurement, using an initial pose as an inertial reference frame.

The actuators 108 of the control system 100 may include, without limitation, one or more of pneumatic actuators, hydraulic actuators, electro-mechanical actuators, or the like. Furthermore, the actuators 108 may be configured as linear actuators, rotary actuators, or a combination thereof.

The actuators 108 may be disposed on the robot 10 at various locations to effect motion of the robot 10. For example, each of the limbs (i.e. arms, legs) of the robot 10 may include a plurality of actuators 108 to change a configuration of one or more joints 16 of the appendages 14.

The sensor(s) 110 of the control system 100 may include, without limitation, one or more of force sensors, torque sensors, velocity sensors, acceleration sensors, position sensors (linear and/or rotational position sensors), motion sensors, location sensors, load sensors, temperature sensors, touch sensors, depth sensors, ultrasonic range sensors, infrared sensors, object sensors, and/or cameras. The sensors 110 may be disposed on the robot 10 at various locations such as the body 12 and/or the appendages 14, and are configured to provide corresponding sensor data to the controller 102 for monitoring and controlling operation of the robot 10 within an environment. In some examples, the controller 102 is configured to receive sensor data from sensors 110 physically separated from the robot 10. For instance, the controller 102 may receive sensor data from a proximity sensor disposed on a target object the robot 10, or from a remote sensor within the environment of the robot 10.

The sensor data from the sensors 110 may allow the controller 102 to evaluate conditions for maneuvering the robot 10, altering a pose of the robot 10, and/or actuating various actuators 108 for moving/rotating mechanical components such as one of the appendages 14. In some examples, the control system 100 employs one or more force sensors to measure load on the actuators 108 that move the robot 10. The sensors 110 may further include position sensors to sense states of extension, retraction, and/or rotation of the body 12 and/or the appendages 14.

Other sensors 110 may capture sensor data corresponding to the terrain of the environment and/or nearby objects/obstacles to assist with environment recognition and navigation. For instance, some sensors 110 may include RADAR (e.g., for long-range object detection, distance determination, and/or speed determination) LIDAR (e.g., for short-range object detection, distance determination, and/or speed determination), VICON® (e.g., for motion capture), one or more imaging (e.g., stereoscopic cameras for 3D vision), perception sensors, a global positioning system (GPS) device, and/or other sensors for capturing information of the environment in which the robot 10 is operating.

In some implementations, the control system 100 includes one or more power sources 112 configured to power various components of the robot 10. The power sources 112 employed by the robot 10 may include, without limitation, a hydraulic system, an electrical system, energy storage device(s) (e.g. batteries), and/or pneumatic devices. For instance, one or more energy storage devices may provide power to various components (e.g., actuators 108) of the robot 10. In some examples, the body 12 defines a compartment for storing and retaining energy storage devices. The energy storage devices may be chargeable via wired connections or wireless (e.g. induction) connections to an external power source. Energy storage devices could also be charged using solar energy (e.g., generated via solar panels disposed on the robot 10). In some examples, the energy storage devices are removable so that depleted energy storage devices can be replaced with fully-charged energy storage devices. Gasoline engines could also be employed. A hydraulic system may employ hydraulic motors and cylinders for transmitting pressurized fluid for operating various components of the robot 10.

Figure 2A:
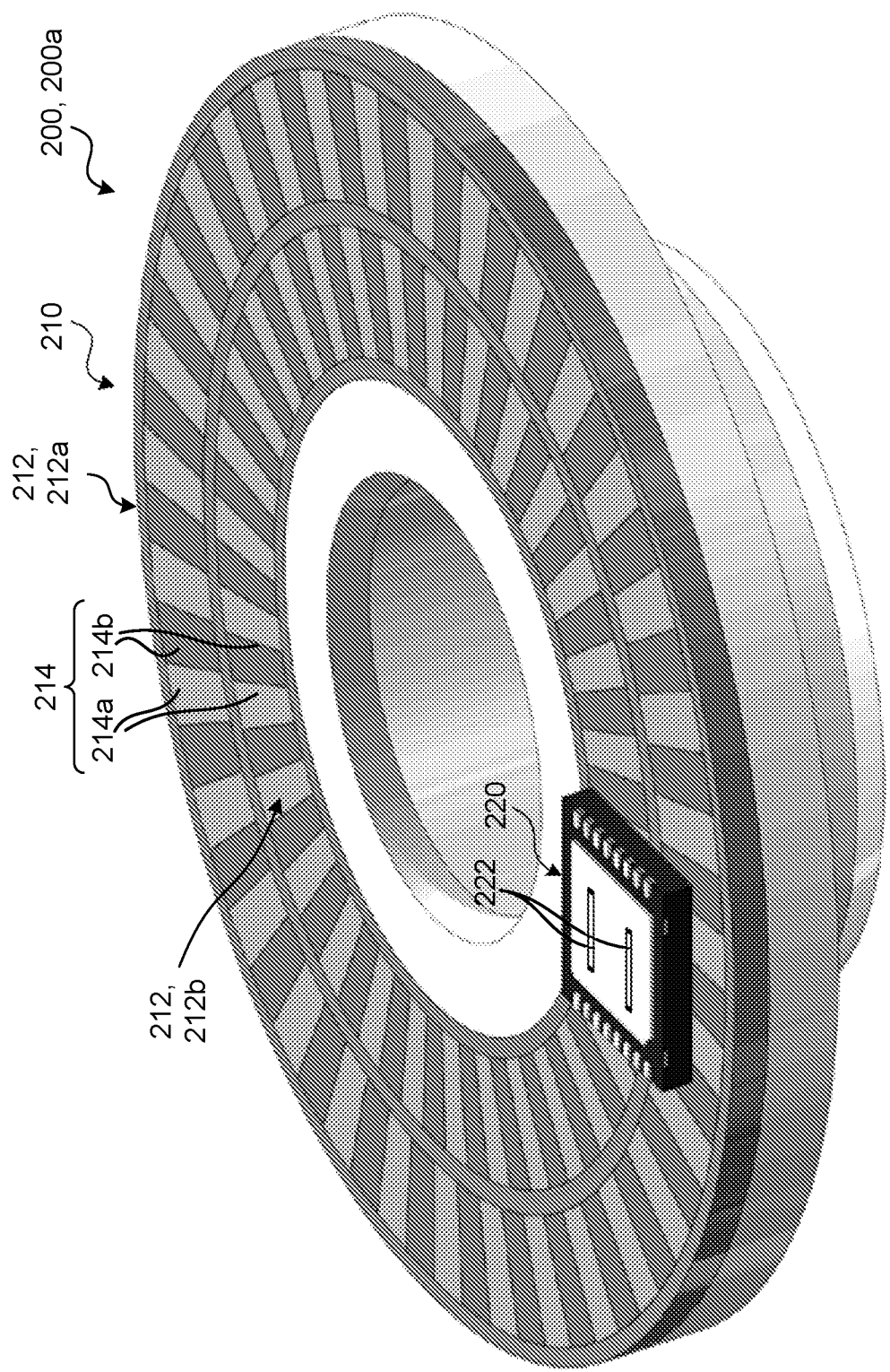
FIG. 2A is a perspective view of a first example of a position measurement system.
Figure 2B:
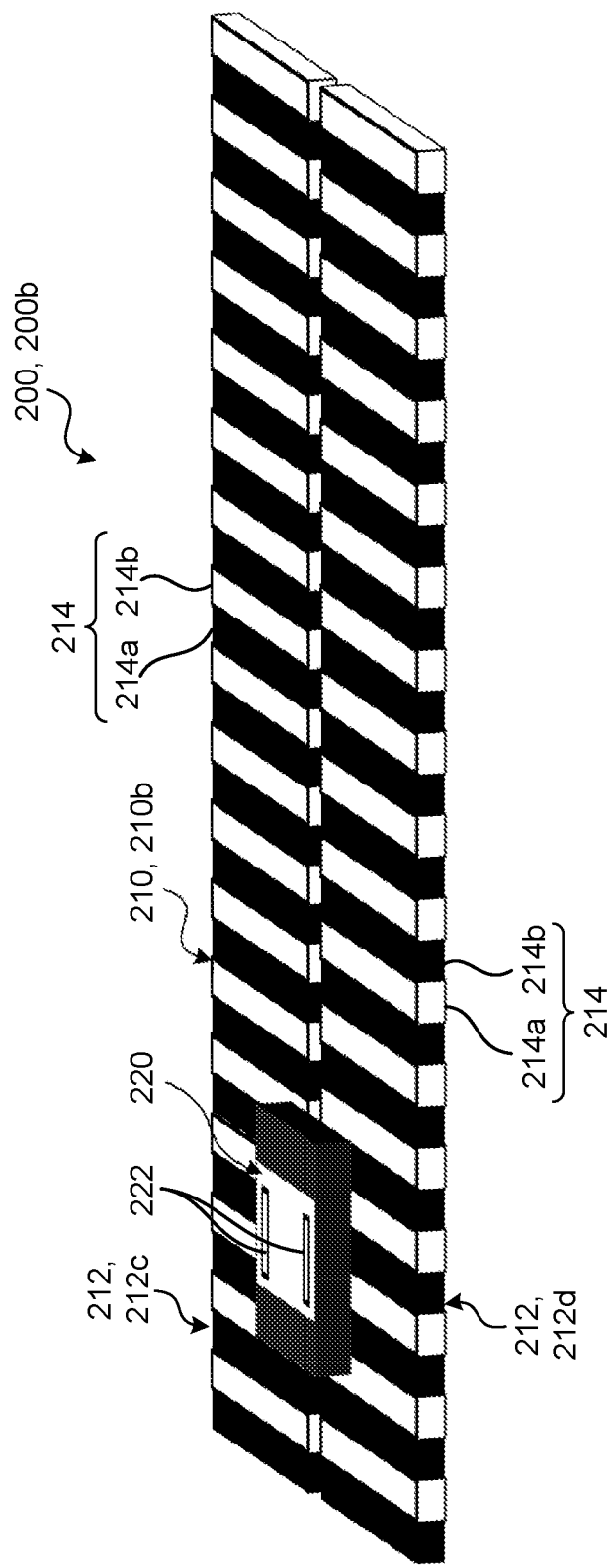
FIG. 2B is a perspective view of a second example of a position measurement system.

Referring to FIGS. 2A and 2B, examples of position measurement systems 200, 200a-b used for measuring an absolute position of a joint 16 of the robot 10 are shown. The position measurement system 200 may be incorporated as one or more of the sensors 110 of the robot. Here, the position measurement systems 200 are configured as off-axis position measurement systems 200 including a magnetic code carrier 210 having a pair of magnetic encoder tracks 212, 212a-d, and an encoder 220 having a pair of position sensors 222 each corresponding to one of the encoder tracks 212. Generally, the position measurement system 200 generates position measurement data 224 and transmits the position measurement data 224 (FIG. 1) to the controller 102. The controller 102 then generates position-dependent data (e.g., velocity, absolute position) for an associated component of the robot 10 based on the position measurement system 200.

FIG. 2A shows a rotative position measurement system 200a configured to measure an absolute rotational position of a rotating joint of the robot 10, such as those shown in FIG. 1. FIG. 2B shows a linear position measurement system 200b configured for measuring an absolute linear position in a translating joint of the robot 10. However, the operating principals of each of the position measurement systems 200a, 200b are fundamentally similar, and will be described as such.

In each example of the position measurement system 200, the magnetic code carrier 210 includes a first magnetic encoder track 212a, 212c having an even number of alternately magnetized pole pairs 214, including positive poles 214a and negative poles 214b. The first magnetic encoder track 212a, 212c may be referred to as a master track. Each example of the magnetic code carrier 210 also includes a second magnetic encoder track 212b, 212d—referred to as a nonius track—disposed adjacent to the master track 212a, 212c and having one less pole pair 214 than the master track 212a, 212c. For example, in the illustrated rotative position measurement system 200a, the outer master track 212a includes thirty-two (32) pole pairs 214, while the nonius track 212b is disposed radially inwardly of the master track 212a and includes thirty-one (31) pole pairs. Similarly, in FIG. 2B, the linear position measurement system 200b includes a master track 212c having sixteen (16) pole pairs, while the adjacent nonius track 212d has fifteen (15) pole pairs. While the illustrated examples show master tracks 212a, 212c having one more pole pair 214 than the corresponding nonius tracks 212b, 212d, any number of pole pairs 214 may be incorporated in either of the tracks 212a-212d, so long as the number of pole pairs 214 in the master track 212a, 212c does not have a common factor with the number of pole pairs 214 in the nonius track. As discussed in greater detail below, the master track 212a, 212c is used for high-precision position definition, while the measurements of the nonius track 212b, 212d are referenced against measurements of the master track to calculate an absolute position on the magnetic code carrier 210.

Referring still to FIGS. 2A and 2B, the encoder 220 includes a pair of the position sensors 222, whereby a first one of the position sensors 222 is aligned with the master track 212a, 212c and a second one of the position sensors 222 is aligned with the nonius track 212b, 212d. In the illustrated examples, the position sensors 222 are embodied as Hall sensors, which are configured to measure a magnitude of a magnetic field of the pole pairs 214. However, the principles of the present disclosure may also be implemented in conjunction with other types of sensors that utilize the concept of a master track and a nonius track, such as vision-based measurement systems.

Each of the position sensors 222 has a length spanning one pole pair 214 of the respective magnetic track 212. Because there is one more pole pair 214 in the master track 212a, 212c than in the nonius track 212b, 212d, the pole pairs 214 of the master track will have a pole width that is less than the pole width of the pole pairs 214 of the nonius track 212b, 212d. As the encoder 220 traverses the magnetic code carrier 210, each of the position sensors 222 on the encoder 220 generates position measurement data 224 that includes periodic sine and cosine signals corresponding to a magnitude of the magnetic fields generated by the pole pairs, with a cycle length corresponding to the pole width of the respective pole pair 214. Thus, the cycle lengths of the sine and cosine signals of the master track 212a, 212c will be less than the cycle lengths of the sine and cosine signals generated by the nonius track 212b, 212d.

FIGS. 3A-3D show example plots 300a-d depicting outputs of raw position measurement data 224 from a rotative position measurement system 200a having a master track 212a, including four pole pairs 214, and a nonius track 212b, including three pole pairs 214. The plot 300a of FIG. 3A shows position measurement data 224a associated with the master track 212a that includes periodic sine and cosine signals generated by the four pole pairs 214. As shown, in the course of a 360-degree rotation (x-axis), the traversal of the encoder 220 over the four pole pairs 214 of the master track 212a results in four cycles each having a cycle length of 90-degrees (360-degrees/4 pole pairs). The plot 300b of FIG. 3B shows position measurement data 224b associated with the nonius track 212b that includes periodic sine and cosine signals generated by the three pole pairs 214. As shown, traversal of the encoder 220 over the nonius track 212b results in three cycles each having a cycle length of 120-degrees (360-degrees/3 pole pairs). Using the position measurement data 224 (i.e., the sine and cosine signals), the controller 102 determines respective phase data 226 for each of the master track 212a and the nonius track 212b. For example, plot 300c of FIG. 3C shows master phase data 226a for the master track 212a while plot 300d of FIG. 3D shows nonius phase data 226b for the nonius track 212b. Thus, as the encoder 220 traverses each of the pole pairs 214, the phase magnitude increases from 0-degrees to 360-degrees for each pole pair 214 traversed by the encoder 220.

Figure 3E:
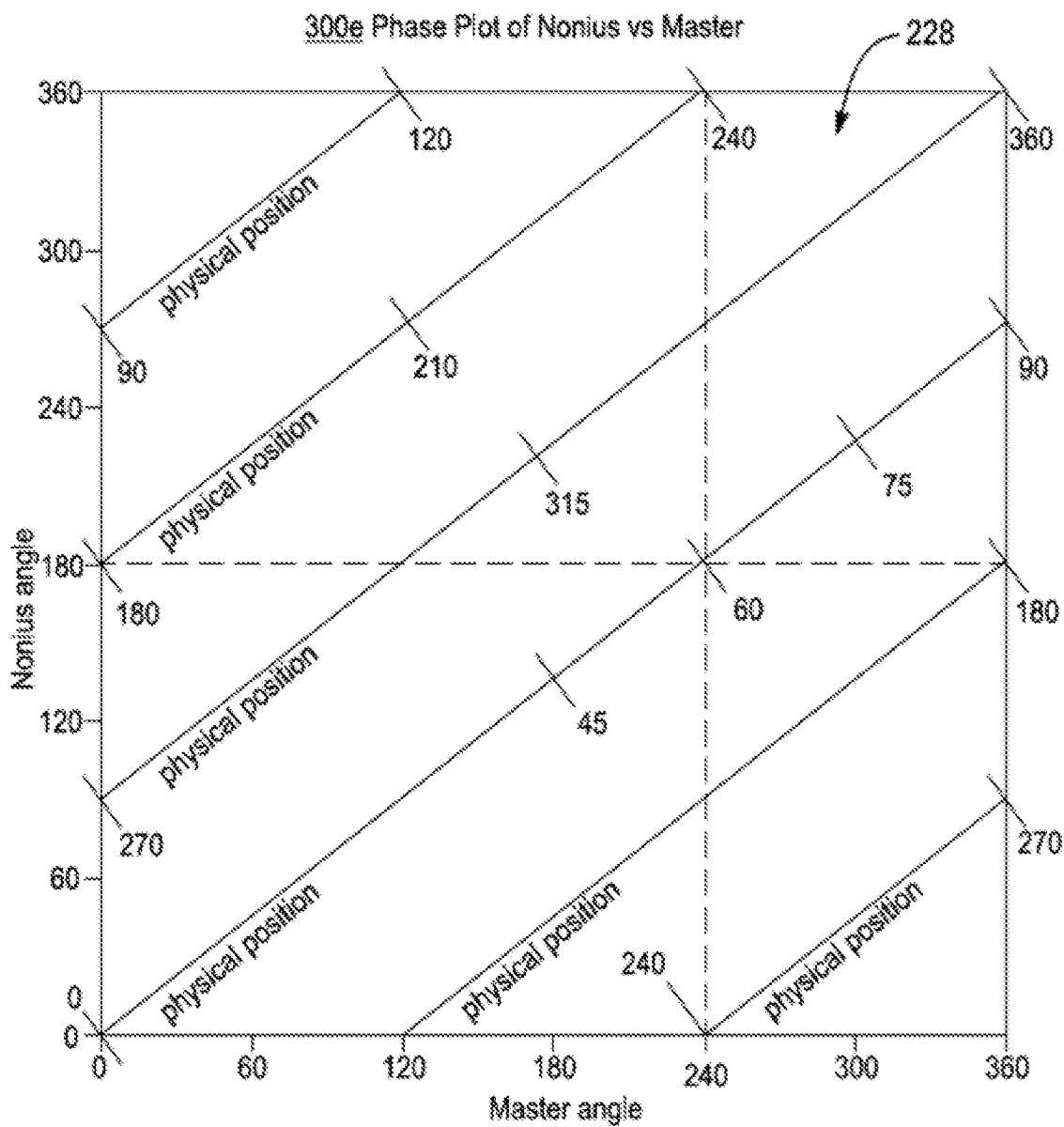
FIG. 3E shows a plot depicting a determination of absolute position for a position measurement system under ideal conditions based on the master phase data of FIG. 3C and the nonius phase data of FIG. 3D.

FIG. 3E shows a phase plot 300e depicting absolute position data 228 generated by plotting the master phase data 226a of FIG. 3C (x-axis) against the corresponding nonius phase data 226b of FIG. 3D (y-axis). Here, the absolute position data 228 includes an absolute position (e.g., angle, position) of the encoder 220 on the magnetic code carrier 210. For example—as illustrated by the intersecting dashed lines—when the encoder 220 indicates a master phase angle of 240-degrees and a nonius phase angle of 180-degrees, the absolute position data 228 includes an absolute position (angle) of the encoder 220 equal to approximately 60-degrees. In practice, the controller 102 is configured to determine the absolute position of the encoder 220 based on the position measurement data 224 received from the position measurement system 200.

Figure 4E:
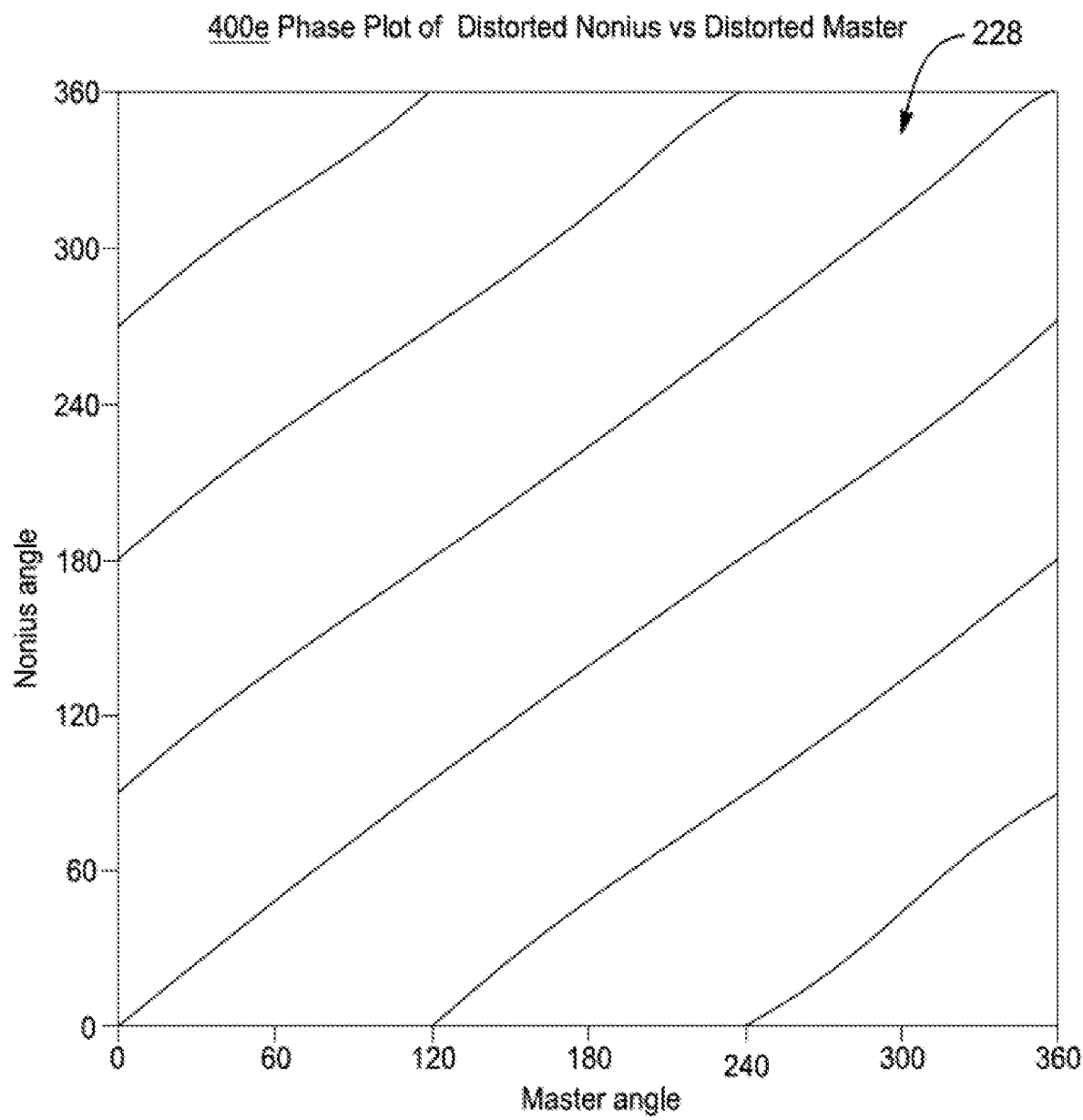
FIG. 4E shows a plot depicting a determination of absolute position for a position measurement system under unideal conditions based on the master phase data of FIG. 4C and the nonius phase data of FIG. 4D.

While FIGS. 3A-3E represent absolute position data 228 under ideal conditions, in practice the measurements taken by the encoder 220 may be imperfect, resulting in the controller 102 receiving position measurement data 224 that is distorted (e.g., shifted, warped, and/or discontinuous). For example, FIGS. 4A-4D show example plots 400a-d depicting position measurement data 224 that is distorted. The distorted position measurement data 224 may be obtained from a rotative position measurement system 200a having a master track 212a, including four pole pairs 214, and a nonius track 212b, including three pole pairs 214. The plot 400a of FIG. 4A shows position measurement data 224a associated with the master track 212a that includes periodic sine and cosine signals generated by the four pole pairs 214, while the plot 400b of FIG. 4B shows position measurement data 224b associated with the nonius track 212b that includes periodic sine and cosine signals generated by the three pole pairs 214. Particularly, FIG. 4A shows the maximum amplitudes (crests) for the cosine signal and the minimum amplitudes for the sine signal of the position measurement data 224a of the master track 212a are shown as being clipped or truncated. Likewise, FIG. 4B shows that the minimum amplitudes for the cosine signal and the sine signal of the position measurement data 224b of the nonius track 212b are clipped. These errors in measurement may be caused by electrical offsets or gain errors, sensor saturation, and/or different physical magnetic pole spacing, for example. Plot 400c of FIG. 4C shows master phase data 226a for the master track 212a while plot 400d of FIG. 4D shows nonius phase data 226b for the nonius track 212b. Regardless of the cause, errors in the position measurement data 224 may result in distortion within the corresponding master phase data 226a of plot 400c (FIG. 4C) for the master track 212a and the corresponding nonius phase data 226b of plot 400d (FIG. 4D) for the nonius track 212b. Consequently, the distortion within the master and nonius phase data 226a, 226b ultimately leads to inaccuracies when determining the absolute position of the encoder 220 (and the joint 16). For example, FIG. 4E shows a phase plot 400e depicting absolute position data 228 generated by plotting the distorted master phase data 226a of FIG. 4C (x-axis) against the corresponding distorted nonius phase data 226b of FIG. 4D (y-axis). Thus, prior to use of the position measurement system 200 in the robot 10, the position measurement system 200 must be calibrated to minimize measurement errors.

Although manufacturers often provide methods for calibrating position in their measurement systems, these methods are impractical for robot applications, as they often require calibration to be conducted on peripheral test equipment prior to installation in the application, such that the calibration does not account for measurement errors induced by the mounting geometry on the robot 10. Thus, to optimize the position measurement system 200 with respect to mounting geometry on the robot 10, the calibration process must be conducted after installation of the position measurement system 200 on the joint 16.

Theoretically, the position measurement system 200 could be calibrated by moving the joint 16 at a constant speed and assigning a calculated position of the joint 16 to the position measurement system 200. However, this is impractical, as it is difficult to maintain a constant speed during motion of the joint 16. For example, many robot joints 16 have a limited range of motion that requires the joint 16 to change directions. Naturally, the change in direction requires a change in speed as the joint 16 approaches and departs from an end point. Alternatively, the position measurement system 200 could be calibrated by cross referencing with data provided from other position sensors 110 in the robot, such as position sensors 110 associated with the actuators 108 or power sources 112. However, mechanical variations within the individual components (e.g., deflections, manufacturing tolerances) introduce a margin of error between the sensors 110. Furthermore, the requisite position sensors 110 needed to calibrate the position measurement system 200 may not be present in these components, or the sensors 110 themselves may be out of calibration.

Figure 5:
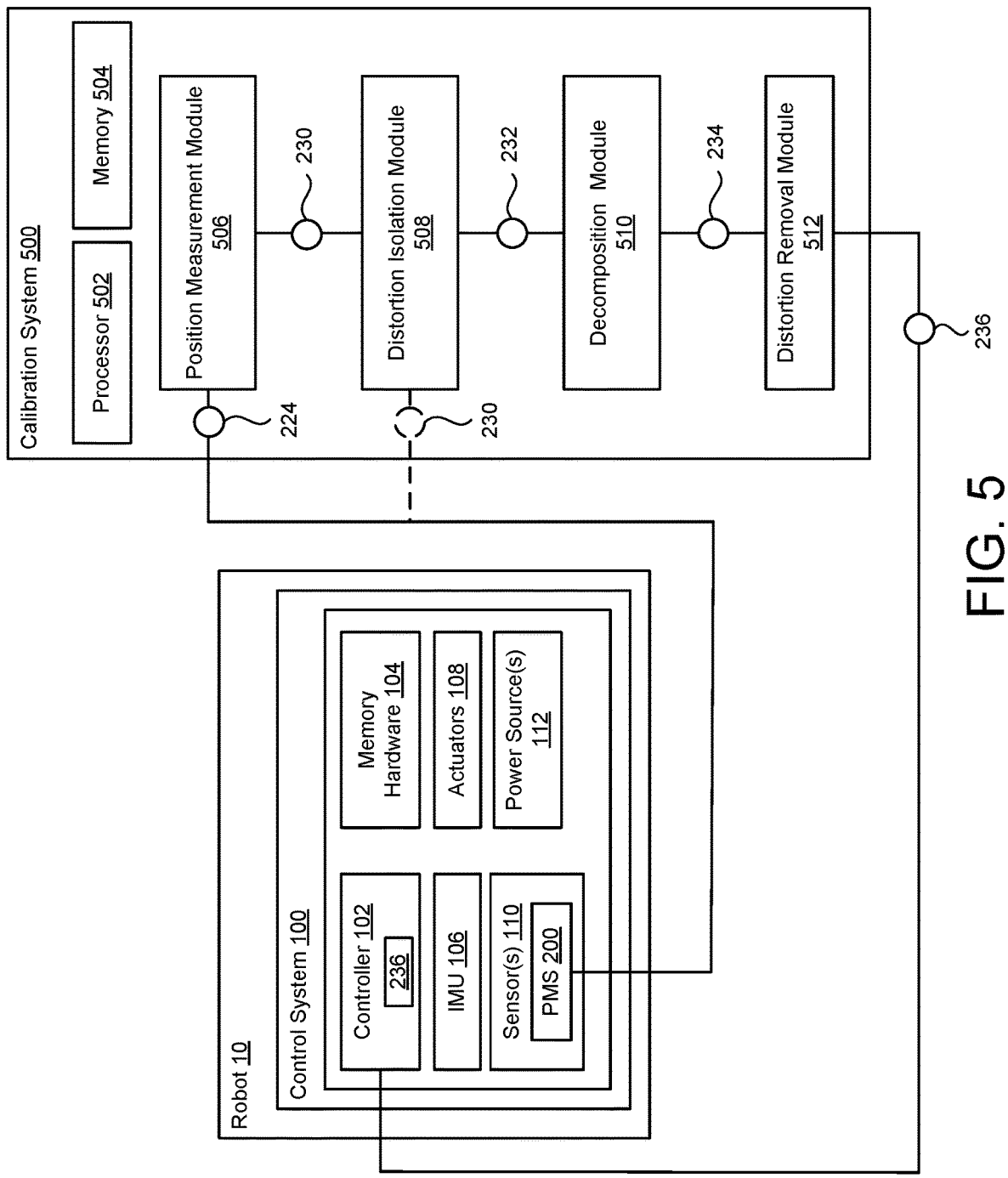
FIG. 5 is a schematic view of a calibration system interfacing with the robotic system.

With reference to FIG. 5, a calibration system 500 is connected to the position measurement system 200 installed on the robot 10, and is configured to calibrate the position measurement system 200 using the raw position measurement data 224 received from the sensors 222 of the position measurement system 200. Thus, unlike the impractical calibration methods described above, the calibration system 500 executes a calibration mode that is configured to calibrate the position measurement system 200 installed on the robot 10 using only the position measurement data 224 obtained by the position measurement system 200. Once the position measurement system 200 is calibrated by the calibration system 500, the position measurement system 200 may measure subsequent position measurement data 224 during operation of the robot 10 such that the position measurement data 224 is accurate and free of errors including, but not limited to, electrical offsets or gain errors, sensor saturation, and/or different physical magnetic pole spacing. In some examples, the calibration system 500 and the control system 100 are separate components in selective communication with one another. For instance, the calibration system 500 may be a remote system that may connect to the position measurement system 200 to receive raw position measurement data 224 during execution of the calibration mode. In other examples, the calibration system 500 is integral to the control system 100 of the robot and capable of calibrating the position measurement system 200 of the robot 10 as needed.

Referring still to FIG. 5, the calibration system 500 includes a processor 502 (e.g., data processing hardware) and memory hardware 504. The processor 502 corresponds to data processing hardware that may include one or more general purpose processors, digital signal processors, and/or application specific integrated circuits (ASICs). In some implementations, the processor 502 is a purpose-built embedded device configured to perform specific operations with one or more subsystems of the robot 10. The memory hardware 504 is in communication with the processor 502 and may include one or more non-transitory computer-readable storage media such as volatile and/or non-volatile storage components. For instance, the memory hardware 504 may be associated with one or more physical devices in communication with one another and may include optical, magnetic, organic, or other types of memory or storage. The memory hardware 504 is configured to, inter alia, store instructions (e.g., computer-readable program instructions), that when executed by the processor 502, cause the processor 502 to perform numerous operations.

The calibration system 500 further includes a position measurement module 506 in communication with the position measurement system 200 of the robot 10. The position measurement module 506 receives the position measurement data 224, 224a-b in the form of sine and cosine signals from each of the master track 212a, 212c and the nonius track 212b, 212d. Using the position measurement data 224, the position measurement module 506 initially generates the phase data 226, 226a-b for each of the master track 212a, 212c and the nonius track 212b, 212d, and then determines the absolute position data 228 of the encoder 220 over time based on the phase data 226 for each track 212. Additionally, the position measurement module 506 may generate/derive velocity measurement data 230 for each of the master track 212a, 212c and the nonius track 212b, 212d by calculating the rate of change in respective phase angles over time. Alternatively, velocity measurement data 230 may be derived at the robot controller 102 and transmitted to the calibration system 500.

Figure 6:
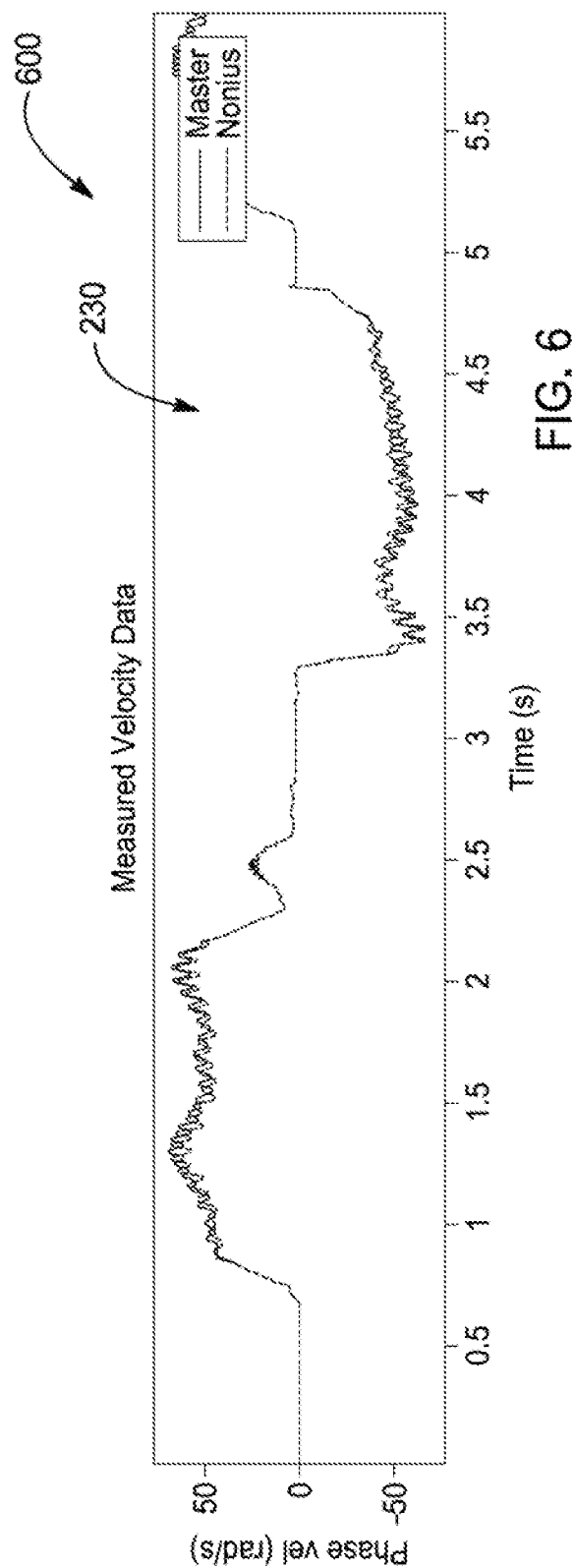
FIG. 6 is a plot showing an example of raw measured velocity data for a position measurement system.

FIG. 6 shows an example plot 600 depicting velocity measurement data 230 over time for each of the master and nonius tracks 212a, 212b associated with the rotative position measurement system 200a of FIG. 2A. The y-axis denotes phase velocity in radians per second (rad/s) and the x-axis denotes time in seconds (s). The plot 600 shows movement by the encoder 220 in a first, forward direction along the magnetic code carrier 210 during a first time period from approximately 0.8 seconds to approximately 2.5 seconds, and then in a second, reversed second direction during a second time period from approximately 3.3 seconds to approximately 4.8 seconds. By generating the velocity measurement data 230, position-dependent distortion in the position measurement data 224 becomes more apparent, whereby distortions in the position measurement data 224 are amplified at higher velocities. For example, referring to the movement by the encoder in the forward direction occurring during the first time period between 0.8 seconds and 2.5 seconds, distortion in the velocity measurement data 230 is proportional to the overall speed of each of the master and nonius tracks 212, whereby the amplitude of the distortion (i.e., the ripple) along the curves is greater at higher speeds (e.g., around 1.3 seconds and 2.0 seconds).

Figure 7:
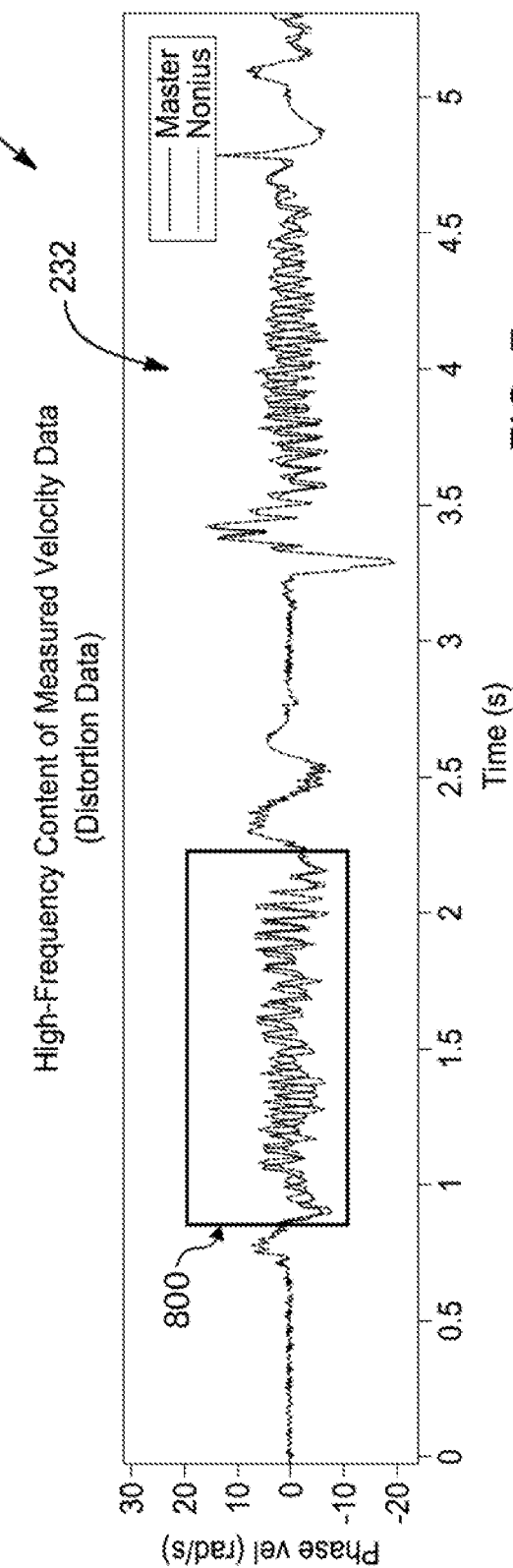
FIG. 7 is a plot showing high-frequency content of the raw measured velocity data of FIG. 6, which corresponds to distortion data.

Referring back to FIG. 5, the calibration module 500 further includes a distortion isolation module 508 configured to extract distortion data 232 from the velocity measurement data 230. The distortion isolation module 508 receives the velocity measurement data 230 for each of the tracks 212 and filters the velocity measurement data 230 to remove low frequencies associated with actual changes in velocity, thereby isolating the high-frequency content of the velocity measurement data 230 that corresponds to the distortion data 232 associated with the periodic distortion. For instance, FIG. 7 shows a plot 700 depicting the distortion data 232 associated with the periodic distortion that corresponds to only the high-frequency content of the velocity measurement data 230 of the plot 600 of FIG. 6. The y-axis denotes phase velocity in radians per second (rad/s) and the x-axis denotes time in seconds (s).

A decomposition module 510 of the calibration system 500 is configured to generate a function that maps the isolated distortion data 232. Accordingly, by isolating the distortion data 232 at the distortion isolation module 508, the decomposition module 510 begins mapping the distortion data 232 by decomposing the distortion data 232 for each of the tracks 212 into harmonics. As described above, the periodic distortion is dependent on the position of the encoder 220 relative to each of the master and nonius tracks 212. Accordingly, periodic distortion could be decomposed into harmonics of the raw position measurement data 224. Equation 1 shows an example function including harmonics of the position-versus-time data.

$$f(x)=x+a\cos(x)+b\sin(x)+c\cos(2x)+d\sin(2x)+\ldots \tag{1}$$

However, because the periodic distortion is scaled or amplified in the velocity measurement data 230, it is advantageous to decompose the periodic distortion present in the velocity measurement data 230 by fitting derivatives of the harmonics of the position measurement data 224 to the velocity measurement data 230. Equation 2 shows an example format of a derived calibration function, or calibration parameter 234, for decomposing the velocity measurement data 230, where the function f'(x) (i.e., calibration parameter 234) is constructed by adding the derivatives of the harmonics of the position measurement data (e.g., a v sin(x), b v cos (x), 2 c v sin(2x)+2 d v cos(2x)) 224 until the resulting function f'(x) (i.e., calibration parameter 234) matches the distortion data 232.

$$f'(x) = v - a\ v\ \sin(x) + b\ v\ \cos(x) - 2c\ v\ \sin(2x) + 2d\ v\ \cos(2x) + \ldots \quad (2)$$

Figure 8:
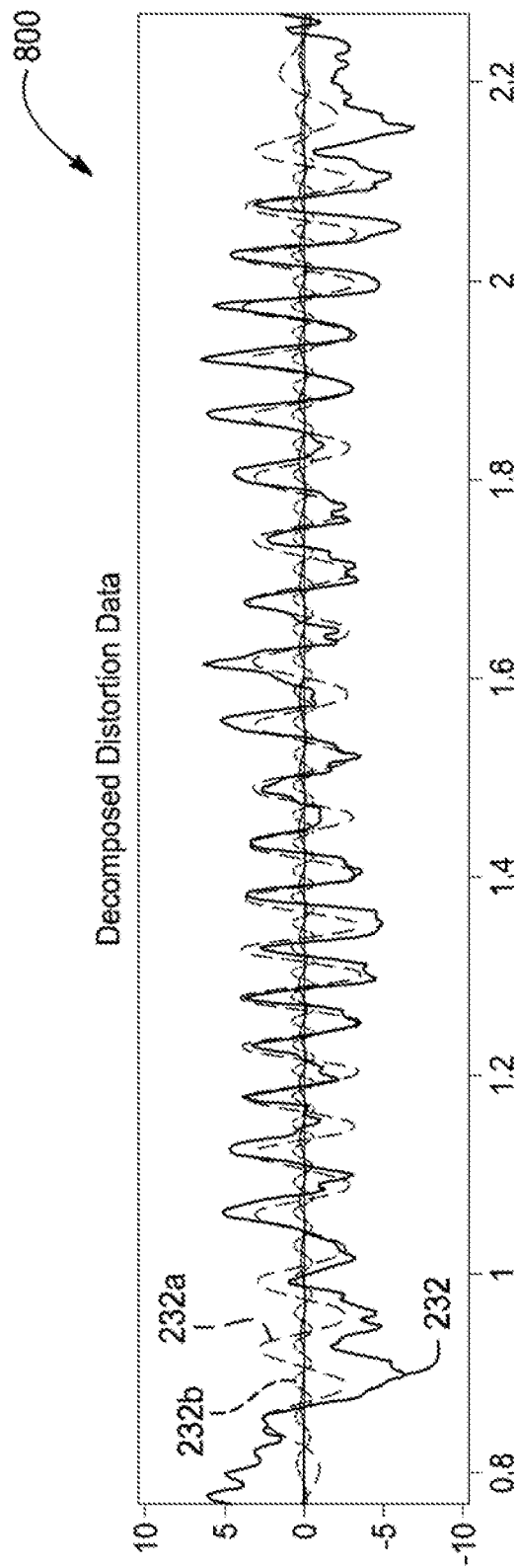
FIG. 8 is a detailed view within box 800 of the plot of FIG. 7 showing a decomposition of the distortion data into periodic components.

The decomposition module 510 iteratively builds the calibration parameter 234 using Equation 2 to determine the periodic components of the periodic distortion. Referring to FIG. 8, a detailed view within box 800 of the plot 700 of FIG. 7 shows the distortion data 232 of the master track 212a overlaid with derivatives of harmonics 232a, 232b that result in a best-fit curve for the distortion data 232. By fitting the derivatives of the harmonics to the distortion data 232, the decomposition module 510 more accurately maps the frequency and amplitude of the periodic distortion with the periodic components (i.e., derivatives of the harmonics 232a, 232b).

After determining the best-fitting periodic components 232a, 232b for the distortion data 232, the decomposition module 510 provides the calibration parameter 234 including the periodic components 232a, 232b to a distortion removal module 512 for modifying the position measurement data 224 by removing the periodic components 232a, 232b from the position measurement data 224. Particularly, the distortion removal module 512 may determine a sensor calibration profile 236 based on the modified position measurement data 224 and provide the sensor calibration profile 236 to the controller 102 for calibrating the position measurement system 200. Once the position measurement system 200 is calibrated, the position measurement system 200 may provide accurate measurement data 224 to the controller 102 for controlling operation of the robot 10 (e.g., actuating a limb or appendage). Additionally or alternatively, the calibration system 500 may provide the calibration parameter 232 to the controller 102 and the controller 102 may calibrate the position measurement system 200 using the calibration parameter 232. For example, the controller 102 may modify velocity measurement data 230 derived from the position measurement system 200 and control the robot based on the modified velocity measurement data 230.

Figure 9:
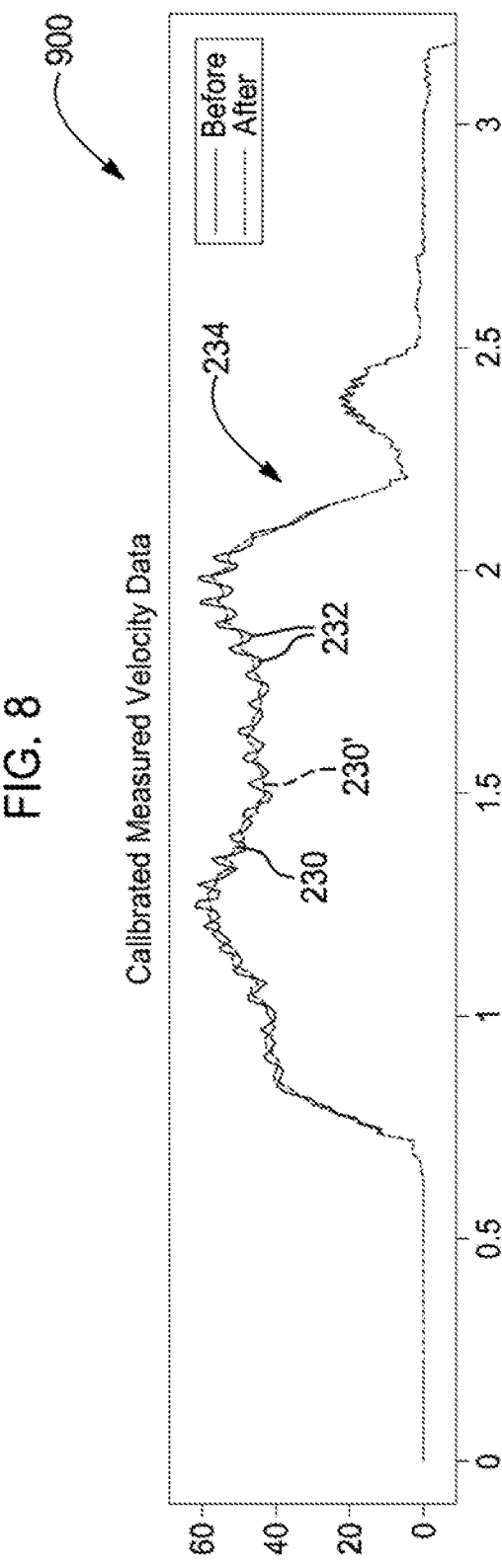
FIG. 9 is a plot showing calibrated measured velocity data in comparison with the raw measured velocity data.

FIG. 9 shows a plot 900 depicting the raw velocity measurement data 230 over time for the master track 212a associated with the rotative position measurement system 200a and the modified velocity measurement data 230'. Here, the modified velocity measurement data 230' corresponds to the sensor calibration profile 236 output from the distortion removal module 512 having the distortion data 232 removed from the raw velocity measurement data 230. The modified velocity measurement data 230' may be used to derive corresponding modified position measurement data 224. Thus, the calibration profile 236 may be generated at the calibration system 500 and transmitted to the control system 100 for implementation in the controller 102, or may be generated by the controller 102 based on the calibration parameter 234

Figure 10:
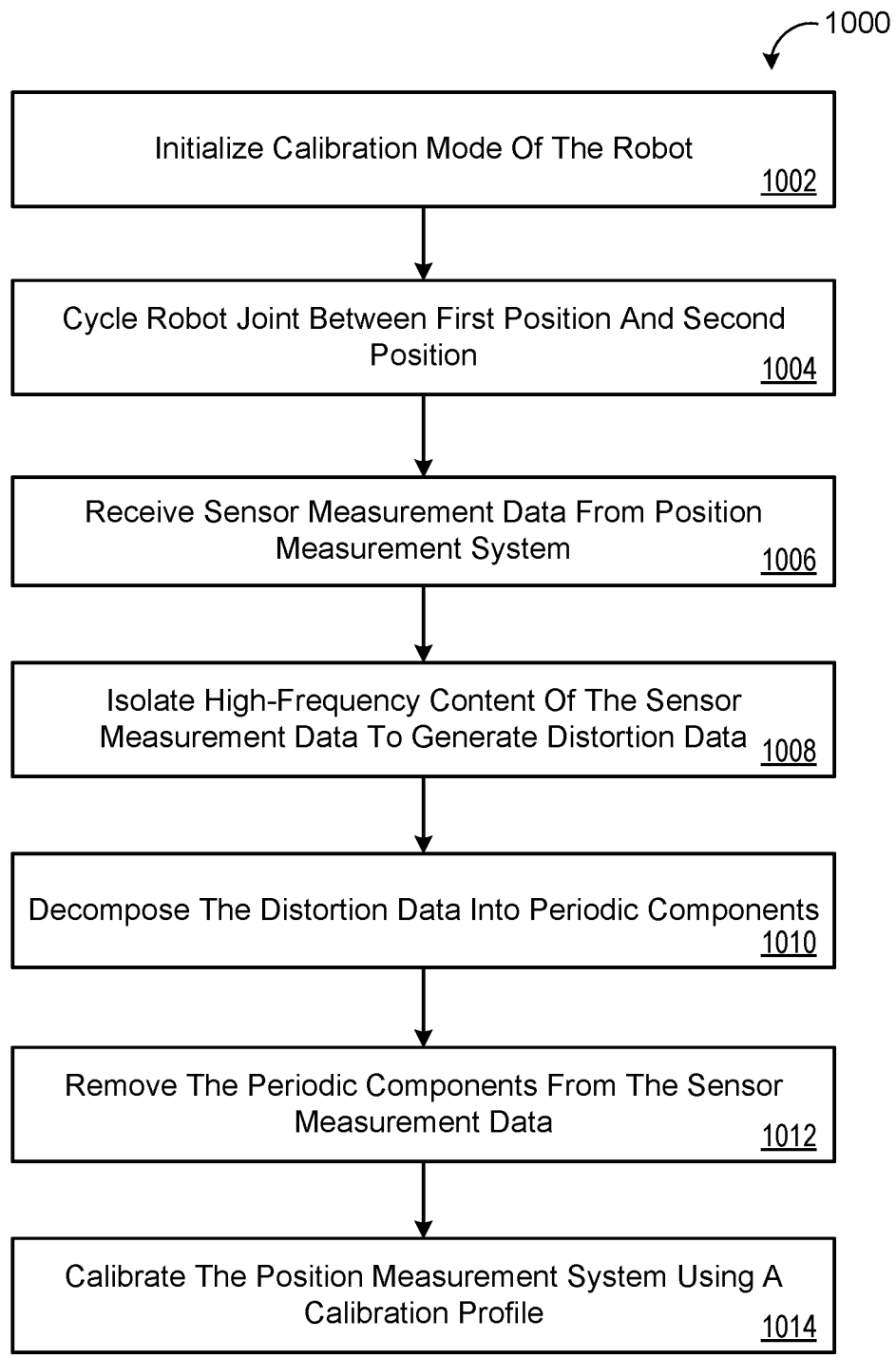
FIG. 10 is a flowchart of an example arrangement of operations for a method of calibrating an off-axis position measurement system.

FIG. 10 provides an example arrangement of operations for a method 1000 of calibrating an off-axis position measurement system 200 having a master track 212a, 212c and a nonius track 212b, 212d. A calibration system 500 may connect to a control system 100 of a robot 10 that includes the off-axis position measurement system 200, and execute a calibration mode for calibrating the off-axis position measurement system 200. The position measurement system 200 may include a rotative position measurement system 200a (FIG. 2A) or a linear position measurement system 200b (FIG. 2B). At operation 1002, the method 1000 includes initializing, by data processing hardware 502 of the calibration system 500, the calibration mode for the position measurement system 200.

At operation 1004, the method 1000 includes instructing, by the data processing hardware 502, the control system 100 to actuate an appendage 14 (e.g., a limb) of the robot 10 to move the appendage 14 through a predetermined range of motion about a joint 16 of the robot 10 at a desired rate. The method 1000 may perform operations 1002 and 1004 simultaneously. The range of motion and the rate of the motion are maximized to provide a maximum sample size of measurement data, and to amplify any periodic distortion that may be present in measurement data 224, 230 obtained by the position measurement system 200. However, the range and rate of motion cannot exceed operating limits of the position measurement system 200. Accordingly, each of the range of motion and the rate of motion must be maintained within minimum and maximum limits.

At operation 1006, the method 1000 includes receiving, at the data processing hardware 502, the measurement data 224, 230 from the position measurement system 200. In some examples, the measurement data includes position measurement data 224, whereby the position measurement module 506 is configured to derive velocity measurement data 230 by calculating the rate of change in the position measurement data 224 over time. Alternatively, the calibration system 500 may receive raw velocity measurement data 230 directly from the control system 100 of the robot 10. As used herein, the term "measurement data" may refer to either or both position measurement data 224 and velocity measurement data 230.

At operation 1008, the method 1000 includes determining, by the data processing hardware 502, that the velocity measurement data 230 includes periodic distortion data 232 by isolating high-frequency content of the velocity measurement data 230. For instance, the distortion isolation module 508 may filter out low-frequency content of the velocity measurement data 230 to isolate the high-frequency content, wherein the high-frequency content corresponds to the periodic distortion data 232. Here, a threshold frequency level for filtering out the low-frequency content from the velocity measurement data 230 is selected by the distortion isolation module 508, wherein the low-frequency content of velocity measurement data 230 is associated with changes in velocity during actuation of the joint 16. For example, changes in velocity associated with starting and stopping the actuation of the joint 16, or caused by variation in the rate of motion during actuation of the joint, are removed from the velocity measurement data 230. The remaining high-frequency content of the velocity measurement data 230 corresponds to distortion data 232 present in the velocity measurement data 230.

At operation 1010, the method 1000 includes decomposing, by the data processing hardware 502, the distortion data 232 into a series of periodic components. The periodic components may include derivatives of harmonics of a position function corresponding to the position measurement data 224. Here, the decomposition module 510 iteratively determines a calibration parameter 234 that includes the periodic components that result in a best-fit to the distortion data 232.

At operation 1012, the method 1000 includes removing, by the data processing hardware 502, the periodic components from the position measurement data 224 and/or the velocity measurement data 230 to modify the position measurement data 224 and/or the velocity measurement data 230. Accordingly, the distortion removal module 512 of the calibration system 500 may generate a calibration profile 236 corresponding to the modified position measurement data 224 and/or the modified velocity measurement data 230.

At block 1014, the method 1000 includes calibrating, by the data processing hardware 502, the position measurement system 200 using the calibration profile 236. Here, the calibration profile 236 may be used by the controller 102 to calibrate the position measurement system 200 so that subsequent position measurement data 224 or the velocity measurement data 230 obtained by the position measurement system 200 during operation of the robot 10 does not include any distortion data 232.

Figure 11:
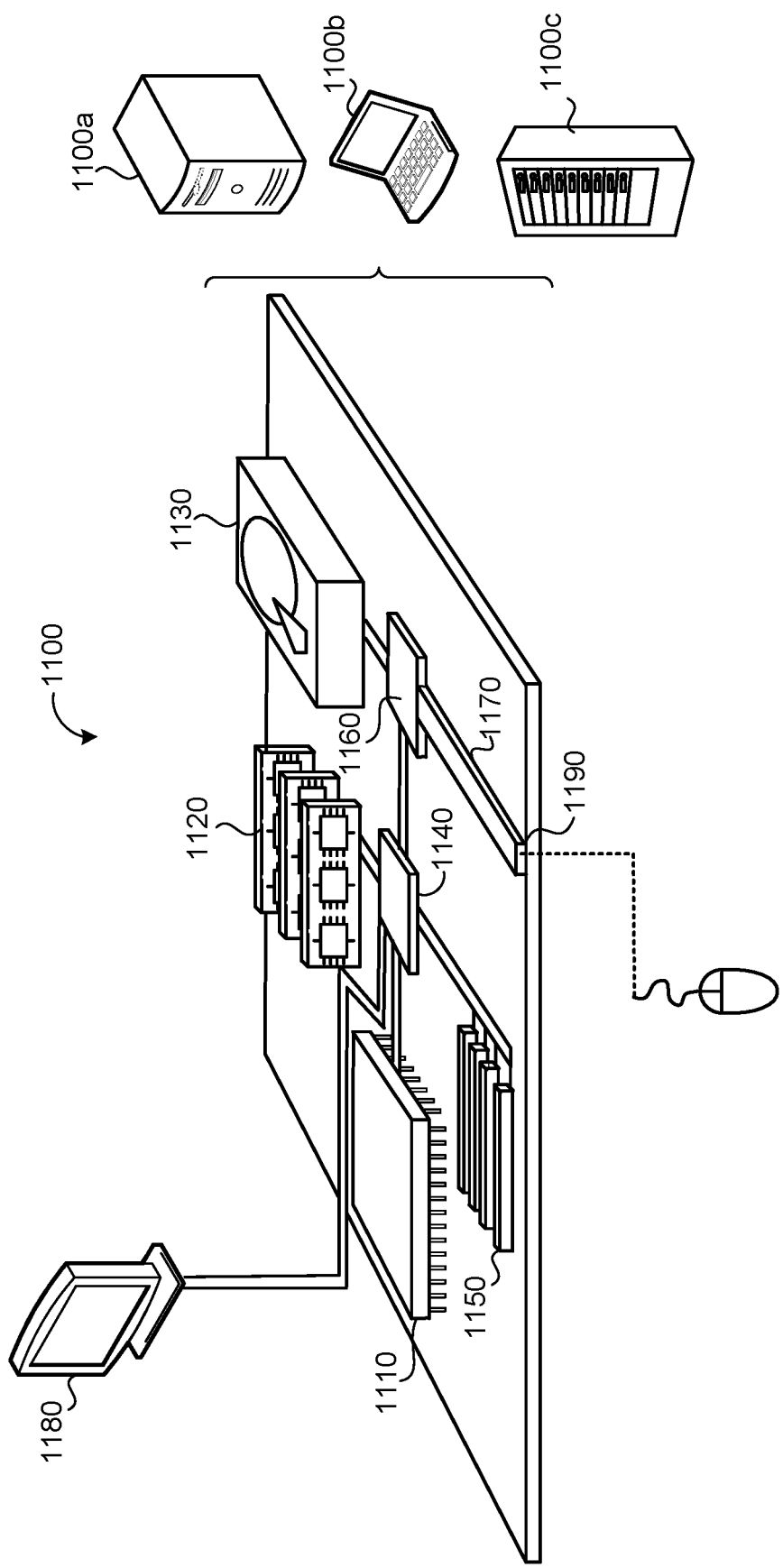
FIG. 11 is a schematic view of an example computing device that may be used to implement the systems and methods described herein.

FIG. 11 is schematic view of an example computing device 1100 that may be used to implement the systems and methods described in this document. The computing device 1100 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 1100 includes a processor 1110 (e.g., data processing hardware 502), memory 1120, a storage device 1130, a high-speed interface/controller 1140 connecting to the memory 1120 and high-speed expansion ports 1150, and a low speed interface/controller 1160 connecting to a low speed bus 1170 and a storage device 1130. Each of the components 1110, 1120, 1130, 1140, 1150, and 1160, are interconnected using various busses, and may be mounted on a common motherboard or in other manners as appropriate. The processor 1110 can process instructions for execution within the computing device 1100, including instructions stored in the memory 1120 or on the storage device 1130 to display graphical information for a graphical user interface (GUI) on an external input/output device, such as display 1180 coupled to high speed interface 1140. In other implementations, multiple processors and/or multiple buses may be used, as appropriate, along with multiple memories and types of memory. Also, multiple computing devices 1100 may be connected, with each device providing portions of the necessary operations (e.g., as a server bank, a group of blade servers, or a multi-processor system).

The memory 1120 (e.g. memory hardware 504) stores information non-transitorily within the computing device 1100. The memory 1120 may be a computer-readable medium, a volatile memory unit(s), or non-volatile memory unit(s). The non-transitory memory 1120 may be physical devices used to store programs (e.g., sequences of instructions) or data (e.g., program state information) on a temporary or permanent basis for use by the computing device 1100. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 1130 (e.g., memory hardware 504) is capable of providing mass storage for the computing device 1100. In some implementations, the storage device 1130 is a computer-readable medium. In various different implementations, the storage device 1130 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 1120, the storage device 1130, or memory on processor 1110.

The high speed controller 1140 manages bandwidth-intensive operations for the computing device 1100, while the low speed controller 1160 manages lower bandwidth-intensive operations. Such allocation of duties is exemplary only. In some implementations, the high-speed controller 1140 is coupled to the memory 1120, the display 1180 (e.g., through a graphics processor or accelerator), and to the high-speed expansion ports 1150, which may accept various expansion cards (not shown). In some implementations, the low-speed controller 1160 is coupled to the storage device 1130 and a low-speed expansion port 1190. The low-speed expansion port 1190, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 1100 may be implemented in a number of different forms, as shown in the figure. For example, it may be implemented as a standard server 1100a or multiple times in a group of such servers 1100a, as a laptop computer 1100b, or as part of a rack server system 1100c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A method comprising:
   receiving, at data processing hardware, position measurement data from a position measurement system that is configured to measure a position of a joint of a robot, the position measurement system comprising a nonius track and a master track;
   determining, by the data processing hardware, that the position measurement data comprises periodic distortion data;
   modifying, by the data processing hardware, the position measurement data by:
      obtaining velocity measurement data based on the position measurement data;
      identifying the periodic distortion data from the velocity measurement data;
      decomposing the periodic distortion data into periodic components; and
      removing the periodic components from the position measurement data; and
   controlling, via the data processing hardware, the joint of the robot based on the modified position measurement data.

2. The method of claim 1, wherein determining that the position measurement data comprises periodic distortion data comprises filtering out low-frequency content of the velocity measurement data to isolate high-frequency content of the velocity measurement data, the high-frequency content of the velocity measurement data comprising the periodic distortion data.

3. The method of claim 1, further comprising:
   generating, by the data processing hardware, a calibration profile corresponding to the modified position measurement data; and
   calibrating, by the data processing hardware, the position measurement system using the calibration profile.

4. The method of claim 1, wherein the periodic distortion data corresponds to at least one of a gain error, sensor saturation, or a physical variation in magnetic pole spacing at the position measurement system.

5. The method of claim 1, wherein:
   the position measurement data comprises first position measurement data for the master track and second position measurement data for the nonius track; and
   the periodic distortion data is present in each of the first position measurement data and the second measurement data.

6. The method of claim 1, wherein receiving the position measurement data from the position measurement system comprises:
   executing a calibration mode for calibrating the position measurement system coupled to the robot, the calibration mode configured to actuate a limb of the robot through a range of motion about the joint; and
   receiving the position measurement data from the position measurement system, the measurement data associated with the actuation of the limb of the robot.

7. A system comprising:
   data processing hardware; and
   memory hardware in communication with the data processing hardware, the memory hardware storing instructions that when executed on the data processing hardware cause the data processing hardware to perform operations comprising:
      receiving position measurement data from a position measurement system that is configured to measure a position of a joint of a robot, the position measurement system comprising a nonius track and a master track;
      determining that the position measurement data comprises periodic distortion data;
      modifying the position measurement data by:
         obtaining velocity measurement data based on the position measurement data;
         identifying the periodic distortion data from the velocity measurement data;
         decomposing the periodic distortion data into periodic components; and
         removing the periodic components from the position measurement data; and
      controlling the joint of the robot based on the modified position measurement data.

8. The system of claim 7, wherein determining that the position measurement data comprises periodic distortion data comprises filtering out low-frequency content of the velocity measurement data to isolate high-frequency content of the velocity measurement data, the high-frequency content of the velocity measurement data comprising the periodic distortion data.

9. The system of claim 7, wherein the operations further comprise:
generating a calibration profile corresponding to the modified position measurement data; and
calibrating the position measurement system using the calibration profile.

10. The system of claim 7, wherein the periodic distortion data corresponds to at least one of a gain error, sensor saturation, or a physical variation in magnetic pole spacing at the position measurement system.

11. The system of claim 7, wherein:
the position measurement data comprises first position measurement data for the master track and second position measurement data for the nonius track; and
the periodic distortion data is present in each of the first position measurement data and the second position measurement data.

12. The system of claim 7, wherein receiving the position measurement data from the position measurement system comprises:
executing a calibration mode for calibrating the position measurement system coupled to the robot, the calibration mode configured to actuate a limb of the robot through a range of motion about the joint; and
receiving the position measurement data from the position measurement system, the position measurement data associated with the actuation of the limb of the robot.

13. A method comprising:
receiving, at data processing hardware, position measurement data associated with an off-axis position measurement system that is configured to measure a position of a joint of a robot;
determining, by the data processing hardware, that the position measurement data comprises periodic distortion data;
obtaining velocity measurement data based on the position measurement data;
identifying the periodic distortion data from the velocity measurement data;
decomposing, by the data processing hardware, the periodic distortion data into periodic components;
generating, by the data processing hardware, a calibration profile based on removing the periodic components of the periodic distortion data from the position measurement data;
calibrating, by the data processing hardware, the off-axis position measurement system using the calibration profile; and
controlling, by the data processing hardware, the joint of the robot based on calibrated position measurement data associated with the calibrated off-axis position measurement system.

14. The method of claim 13, wherein determining that the position measurement data comprises periodic distortion data comprises filtering out low-frequency content of the velocity measurement data to isolate high-frequency content of the velocity measurement data, the high-frequency content of the velocity measurement data comprising the periodic distortion data.

15. The method of claim 13, wherein receiving the position measurement data comprises:
executing a calibration mode for the off-axis position measurement system, the calibration mode configured to actuate a limb of the robot through a range of motion about the joint; and
receiving the position measurement data from the off-axis position measurement system, the position measurement data associated with the actuation of the limb of the robot.

16. A system comprising:
data processing hardware; and
memory hardware in communication with the data processing hardware, the memory hardware storing instructions that when executed on the data processing hardware cause the data processing hardware to perform operations comprising:
receiving position measurement data associated with an off-axis position measurement system that is configured to measure a position of a joint of a robot;
determining that the position measurement data comprises periodic distortion data;
obtaining velocity measurement data based on the position measurement data;
identifying the periodic distortion data from the velocity measurement data;
decomposing the periodic distortion data into periodic components;
generating a calibration profile based on removing the periodic components of the periodic distortion data from the position measurement data;
calibrating the off-axis position measurement system using the calibration profile; and
controlling the joint of the robot based on calibrated position measurement data associated with the calibrated off-axis position measurement system.

17. The system of claim 16, wherein determining that the position measurement data comprises periodic distortion data comprises filtering out low-frequency content of the velocity measurement data to isolate high-frequency content of the velocity measurement data, the high-frequency content of the velocity measurement data comprising the periodic distortion data.

* * * * *